H. H. FEFELL & J. F. OHMER.
COIN COUNTING AND REGISTERING DEVICE.
APPLICATION FILED OCT. 10, 1913.

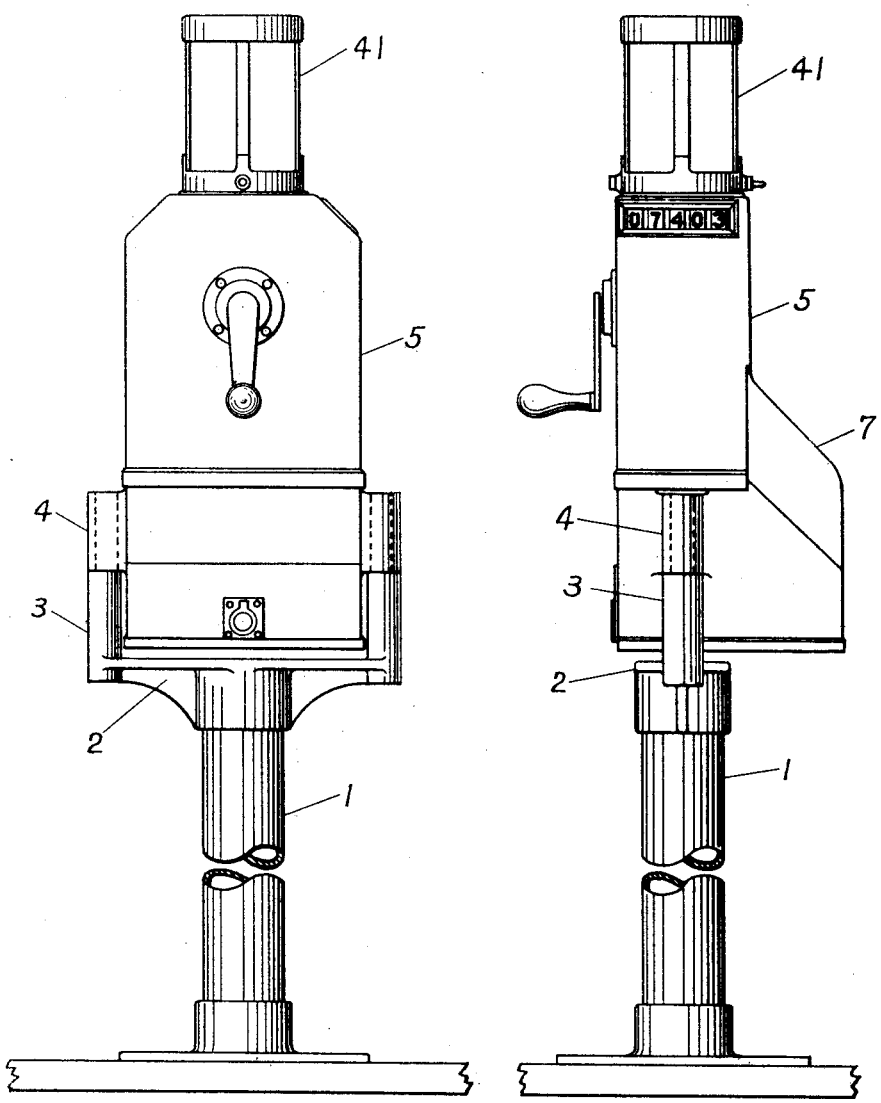

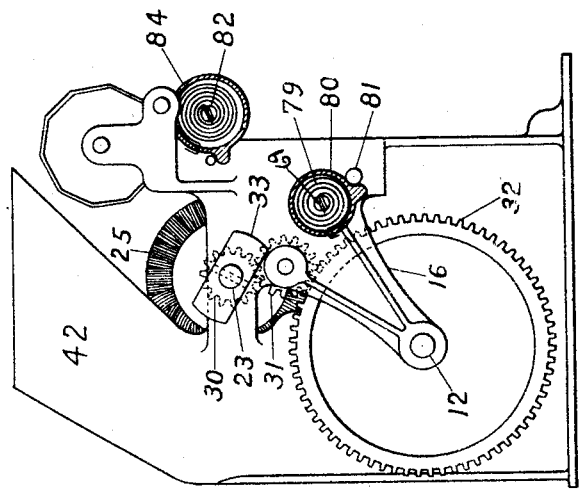
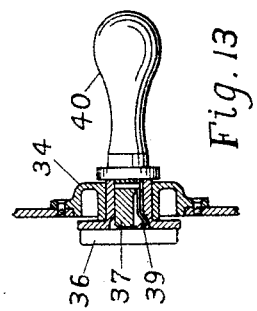
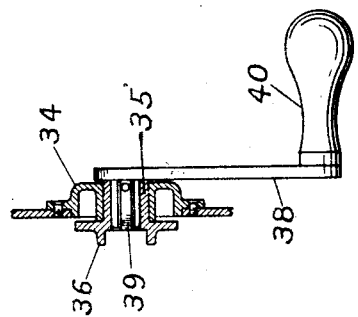

1,210,622.

Patented Jan. 2, 1917.
10 SHEETS—SHEET 5.

H. H. FEFELL & J. F. OHMER.
COIN COUNTING AND REGISTERING DEVICE.
APPLICATION FILED OCT. 10, 1913.

1,210,622.

Patented Jan. 2, 1917.
10 SHEETS—SHEET 6.

Witnesses

Inventor
Henry H. Fefell
John F. Ohmer

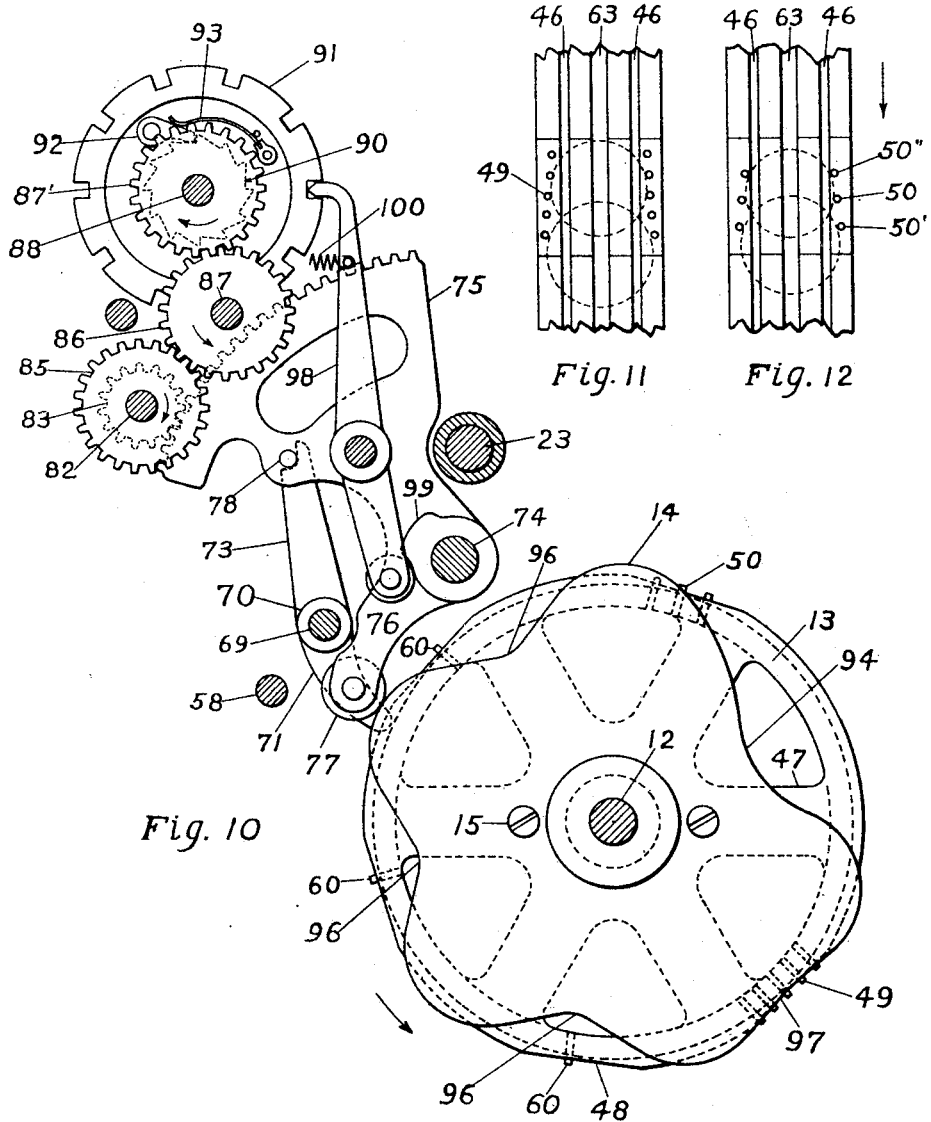

H. H. FEFELL & J. F. OHMER.
COIN COUNTING AND REGISTERING DEVICE.
APPLICATION FILED OCT. 10, 1913.

1,210,622.

Patented Jan. 2, 1917.
10 SHEETS—SHEET 9.

H. H. FEFELL & J. F. OHMER.
COIN COUNTING AND REGISTERING DEVICE.
APPLICATION FILED OCT. 10, 1913.

1,210,622.

Patented Jan. 2, 1917.
10 SHEETS—SHEET 10.

UNITED STATES PATENT OFFICE.

HENRY H. FEFELL AND JOHN F. OHMER, OF DAYTON, OHIO, ASSIGNORS TO OHMER FARE REGISTER COMPANY, OF DAYTON, OHIO, A CORPORATION OF NEW YORK, (INCORPORATED IN 1902.)

COIN COUNTING AND REGISTERING DEVICE.

1,210,622.     Specification of Letters Patent.     Patented Jan. 2, 1917.

Application filed October 10, 1913. Serial No. 794,497.

*To all whom it may concern:*

Be it known that we, HENRY H. FEFELL and JOHN F. OHMER, citizens of the United States, residing at Dayton, county of Montgomery, and State of Ohio, have invented certain new and useful Improvements in Coin Counting and Registering Devices, of which we declare the following to be a full, clear, and exact description.

This invention relates to a type of fare register or device used on street railway cars for collecting and keeping account of the coin or fare paid for transportation.

The main object of the invention is to provide such type of machine having a certain form of mechanism through the instrumentality of which the coins are received and counted or assorted and distributed into separate compartments and registered.

A further object of the invention is the provision of a mechanism which is simple and durable in construction and use.

With these and other objects in view which will appear as the description proceeds, the invention consists in certain novel features of construction and combination of parts, the essential elements of which are set forth in the appended claims and a preferred form of embodiment of which is hereinafter described with reference to the drawings which accompany and form part of this specification.

Figure 3:
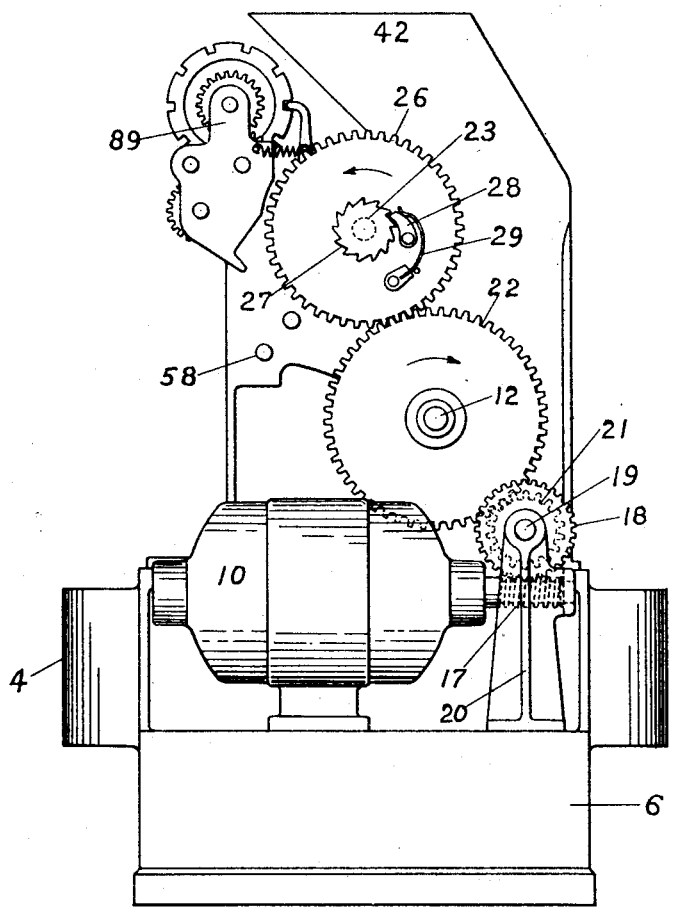
Figure 5:
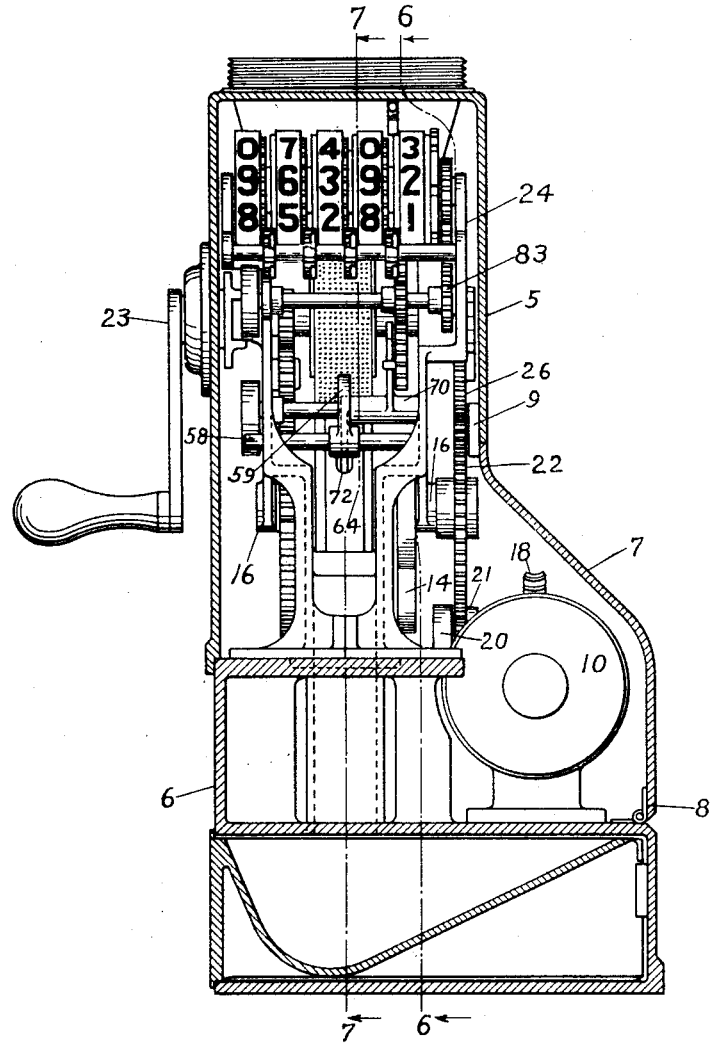
Figure 6:
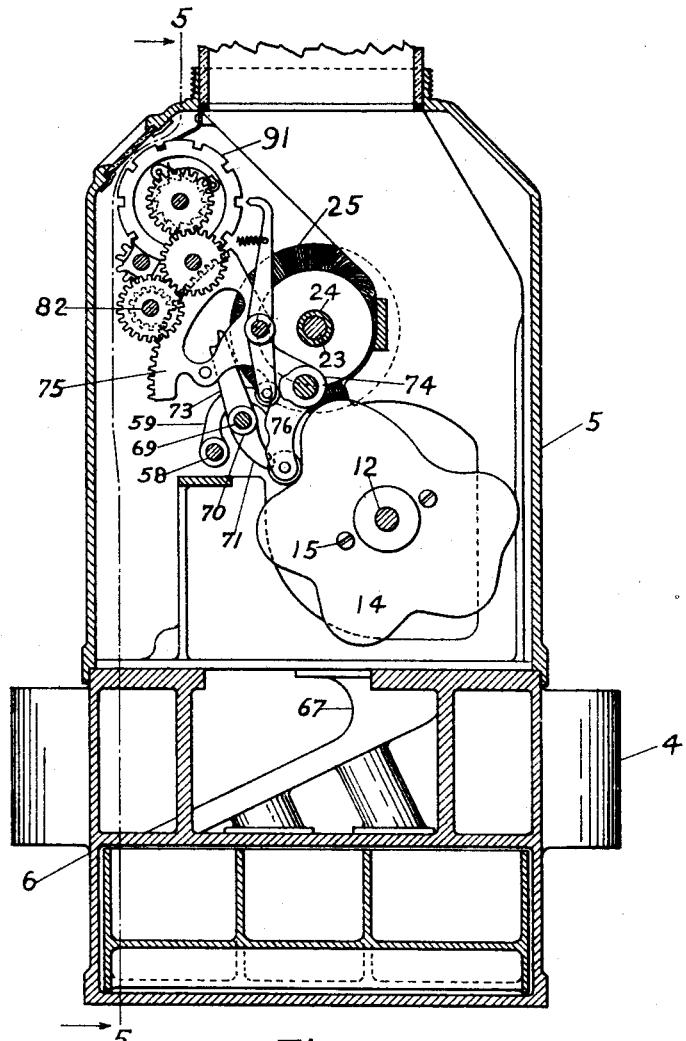
Figure 7:
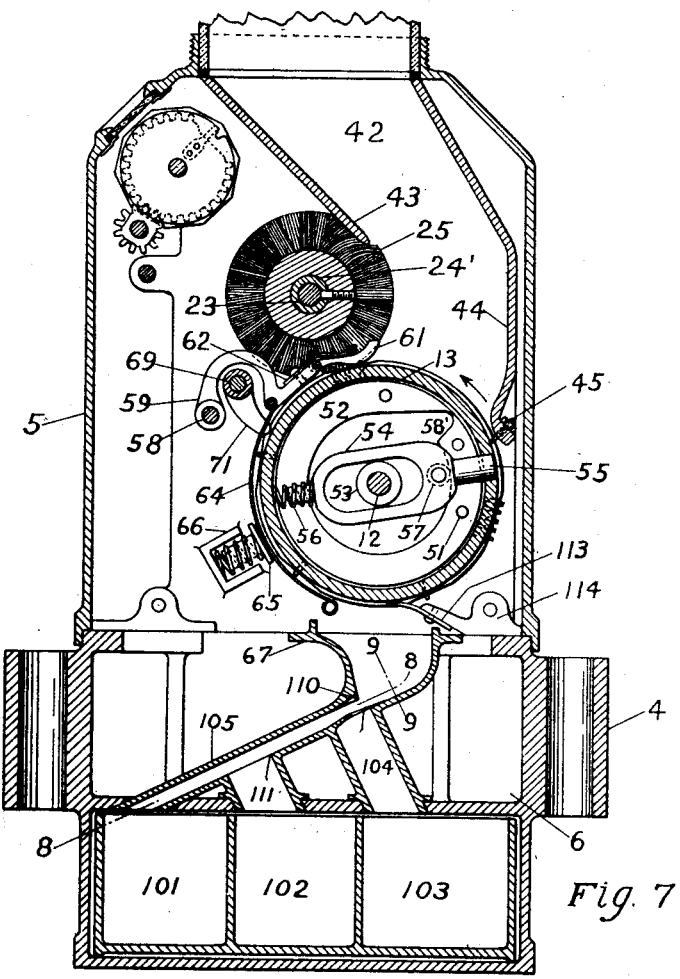
Figure 8:
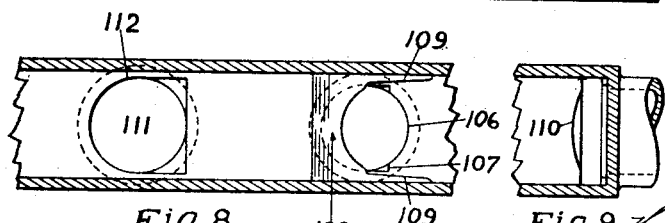
Figure 9:
Figure 15:
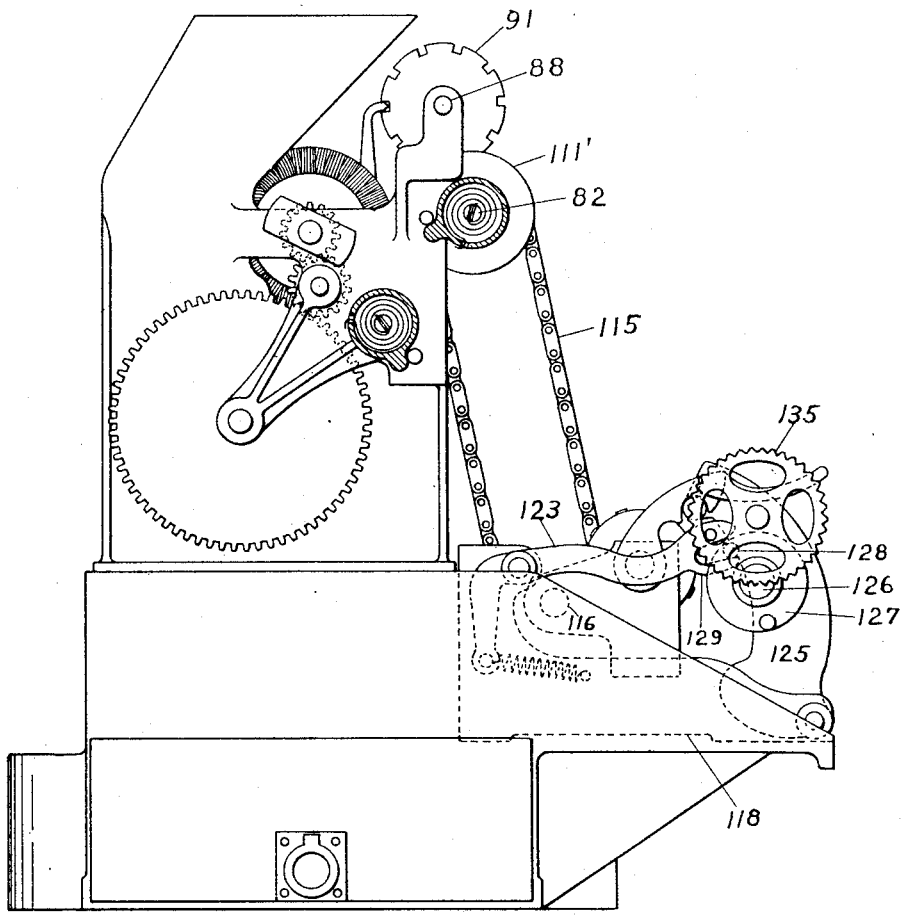
Figure 16:
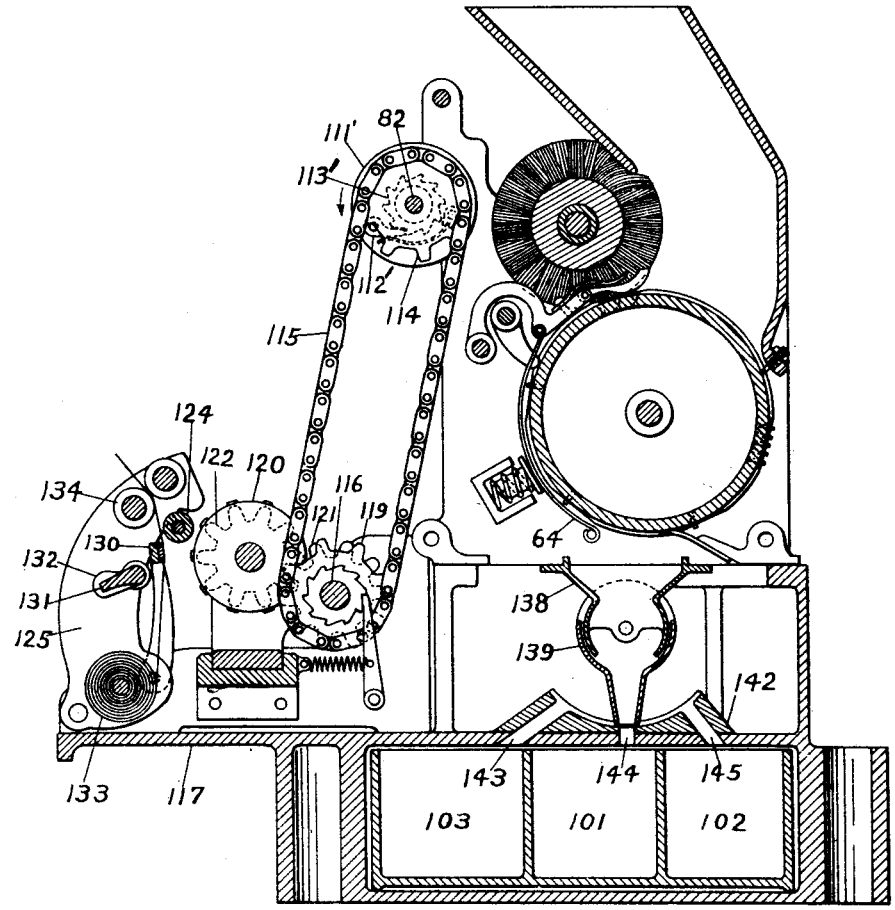
Figure 17:
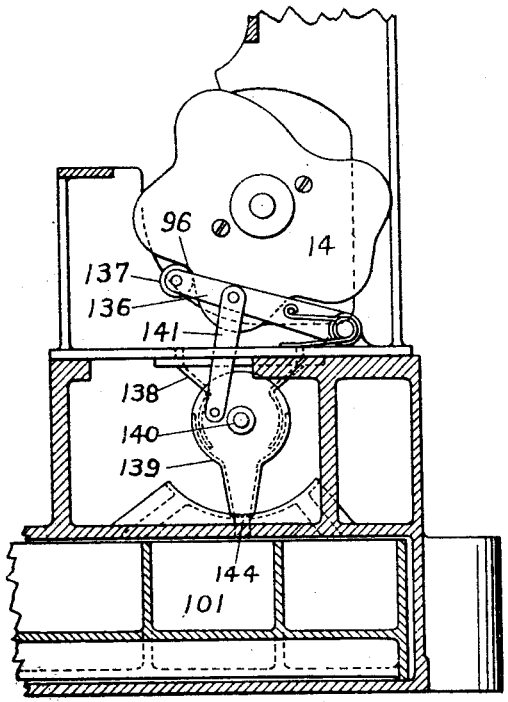

Of said drawings: Figures 1 to 8 inclusive are views of the machine employing a coin counter only with an indicator thereon, but without a registering device to register in permanent form the count made; while Figs. 15, 16 and 17 show the machine with the registering mechanism in addition to the counting mechanism. To proceed more in detail: Fig. 1 is an elevation of the device embodying our invention upon the hand-driven side with the casing thereon covering its operating parts and showing the support upon which it rests and coin receiving hopper surmounting the casing. Fig. 2 is a side elevation taken at right angles to Fig. 1 upon the dial register side, such dial register showing through a sight glass in the casing. Fig. 3 is an elevation upon the motor-driven side with the casing and hopper removed and showing in elevation certain of the operating parts. Fig. 4 is an elevation similar to Fig. 3 but upon the hand-driven side, the lower portion of the frame of the machine containing the coin receptacle being removed. Fig. 5 is a longitudinal sectional view on the line 5—5 of Fig. 6 looking in the direction indicated by the arrows, the section being taken just within the casing shown in Figs. 1 and 2 and showing such casing and the lower frame of the machine in section but showing the operating parts within the casing in elevation. Fig. 6 is a longitudinal sectional view on the line 6—6 of Fig. 5, looking in the direction of the arrows and showing the casing and interior framework of the machine in section but showing the operating parts in elevation at right angles to these parts as shown in Fig. 5. Fig. 7 is a longitudinal sectional view on the line 7—7 of Fig. 5, looking in the direction of the arrows and showing the casing, the frame of the machine, and the operating parts in section. Fig. 8 is a longitudinal sectional view of the coin separating and delivering mechanism on the line 8—8 of Fig. 7. Fig. 9 is a transverse, sectional view of this mechanism on the line 9—9 of Fig. 7. Fig. 10 is an enlarged detailed view showing certain of the operating parts in side elevation. Figs. 11 and 12 are plan views of the selector wheel shown in Fig. 10. Figs. 13 and 14 are enlarged detailed views partly in elevation and partly in section of the manual driving device. Fig. 15 is an elevation of the machine upon its hand-driven side as in Fig. 4 but showing in addition to the parts shown in Fig. 4, the lower frame of the machine to contain the coin distributing device and cash drawer, and also a side elevation of the registering device. Fig. 16 is a central longitudinal sectional view on the same section lines as is Fig. 7 but also showing in addition to the parts shown in Fig. 7, a sectional view of the registering device of Fig. 15; or otherwise stated, Fig. 16 is a central longitudinal sectional view of Fig. 15, the counting device however being removed, and showing a form of coin distributing device differing from that shown in Fig. 7. Fig. 17 is a partial sectional and elevational view similar to Fig. 6 but showing the form of the coin distributing mechanism shown in Fig. 16.

Like numerals refer to like parts throughout the drawings.

The machine is shown as supported upon a stanchion 1 having a holding bracket 2 from which extend uprights 3 over which are fitted the ears 4 upon the lower box-like frame of the machine. By this construction, the machine is readily adjusted in a firmly supported position and removed therefrom simply by sliding the ears along the uprights 3 until the lower casing of the machine rests upon the bracket 2 or until the ears 4 clear the uprights 3.

The outer casing 5, as shown in Figs. 5, 6 and 7 rests upon the lower box-like frame 6 of the machine and is removable therefrom. A door 7 is provided hinged to the lower frame 6 as shown at 8 and locked or otherwise maintained in position against the casing 5 as shown at 9, the door being of such shape as to extend about the motor 10 and providing ready access to the motor and surrounding parts for adjustment or repairs.

The shaft 12 is the main driven shaft of the machine and upon this are fixed for rotation therewith the coin selector wheel 13 and the register operating cam 14, both wheel and cam being also fixedly attached together by the screws 15. The shaft 12 is journaled in the V-shaped extension 16 on each side of the frame of the machine, the journal ends of both of these extensions being shown in Fig. 5, and a full side view of one of them being shown in Fig. 4.

Above and to one side of the shaft 12 is a second driven shaft 23 extending through and journaled in each side of the V-shaped frame work 16 of the machine as shown in Fig. 5. Fixedly mounted upon this shaft 23 by means of a hub portion 24' is a brush 25, shown in end elevation in Fig. 5 and in side view in Figs. 4, 6 and 9.

Two means of imparting rotary motion to the shafts 12 and 23 are employed, these means comprising the motor and the hand operated device situated on opposite sides of the frame work of the machine. And in order to enable either means to be employed without interference with the other the following power transmission mechanism is used: Beginning with the motor as a source of power, rotary motion is imparted thereby to the worm 17 upon the motor shaft. This sets in motion the worm wheel 18 upon the shaft 19 journaled in frame extensions 20, one of which is shown in Fig. 3 and one in Fig. 5. Upon the shaft 19 is also fixedly mounted the pinion 21. This meshes with and imparts rotation to the toothed wheel 22 loosely mounted upon the shaft 12. Loosely mounted upon the shaft 23 is a similar toothed wheel 26 meshing with the wheel 22 and receiving rotation therefrom. Fixedly mounted on the end of shaft 23 adjacent the gear wheel 26 is a ratchet 27 and upon the gear wheel 26 is the pawl 28 pressed by the spring 29 into engagement with the ratchet. By the mechanism thus described rotary motion is imparted to the gear wheels 22 and 26 from the motor and to the shaft 23 by the ratchet and pawl. The gear wheel 22, however, being loose upon the shaft 12 does not impart rotation to that shaft. Rotation is imparted to shaft 12 by the gear mechanism upon the opposite or hand operating side of the machine as shown in Fig. 4. This mechanism comprises the small gear 30, fixed on shaft 23, the gear 31 and the large wheel 32 fixedly mounted on shaft 12. This indirect means of imparting rotation to shaft 12 is employed in order that the hand operating mechanism presently to be described may be employed without setting in motion the train of gears upon the motor side of the machine.

The hand operating mechanism is shown in Figs. 4, 13 and 14, and comprises a shaft operating member 33 fixedly mounted on the brush shaft 23 and of greater length than width to provide engaging surfaces for the crank mechanism shown in Figs. 13 and 14. When the outside casing shown in Figs. 1 and 2 is on the machine, a cap 34, Figs. 13 and 14, attached thereto extends over the member 33, the cap having a central perforation or bearing concentric with the shaft 23. In this central perforation extends a member having a hub portion 35 with a cylindrical bearing surface in the central perforation in the cap and an engaging portion 36 with parallel sides to engage the parallel sided member 33 upon the shaft 23. The interior of the hub 35 is square in contour for the reception of a similarly shaped lug 37 extending from the crank 38. The lug 37 is retained in place in the hub portion 35 by means of a spring 39 attached to said lug and extending into a beveled recess in hub 35. By this construction, the lug upon the crank 38 although firmly held in place in the hub portion of the member 35 so as to impart rotation to the member 30, is readily withdrawn therefrom when it is desired to remove the operating crank. By operating the handle 40, rotation is, therefore, imparted to the brush shaft 23, and therefrom to the coin selector wheel shaft 12 by the train of gears 30, 31 and 32. During this rotation of shaft 23, however, the ratchet 27 is rotating in the direction indicated by the arrow on Fig. 3 and does not impart rotation to gear wheel 26 because the pawl 28 thereon rides over the teeth of the ratchet. Consequently rotation is not imparted to the system of gears beginning with wheel 26 and ending at the motor 10.

The coin hopper shown only diagrammatically in Figs. 1 and 2 is designed to receive and deliver the coins to an interior chute or hopper 42, shown in section in Fig. 13

7, and which, as shown in Figs. 3 and 4, is an integral portion of the frame of the machine. One side of this chute is formed into a lip 43 pressing upon the brush as shown in Fig. 7. The lip and the brush at their meeting line thus provide a tight closure so that the coins can not by chance work backward into the interior of the machine. The "flip" given to the brush by this lip also throws the coins outwardly and downwardly upon the coin selector wheel and prevents their sticking to the brush. The opposite side of the chute is extended downwardly as shown at 44 on Fig. 7 and upon the lower extremity of this extension are two projections, in this instance screws, only one of which is shown at 45 on Fig. 7, these screws being spaced apart a distance less than the width of the smallest coin for which the machine is designed, and extending into grooves 46 upon the surface of the coin selector wheel as shown in Figs. 11 and 12. The purpose of this construction is to prevent the coins from dropping or working their way out of the chute between its lower extremity and the surface of the coin selector wheels.

The coin selector wheel, as shown in Fig. 7, is in the form of a hollow drum with the spokes 47 shown in Fig. 10 upon one side only to provide a convenient means of attachment for the cam wheel 14. The peripheral surface of the coin selector wheel is cylindrical in general contour but is provided with flattened or straight-edged portions 48, five of which are shown in Fig. 10 and corresponding to the number of elevations or depressions of the cam wheel 14. Within these flattened portions of the coin selector wheel, pins are firmly embedded and extend beyond their surfaces but not beyond the cylindrical portions of the peripheral surface of the wheel; or, in other words, the pins do not extend beyond the greatest diameter of the wheel. Five spaced groups of these pins are shown in Fig. 10. The group 49, comprising, as shown in plan view in Fig. 11, five duplicate pins, there being 10 pins in the group, the group 50, as shown in Fig. 12, comprising 3 duplicate pins or 6 in the group, while the three groups 60 comprise but one duplicate pin or two in the group. These pins are the direct instrumentalities in selecting the coin, the coin selected then acting upon the counting and registering device subsequently to be described. In order to accomplish this selecting function, the pins are arranged as follows: Group 50 shows the arrangement for the smallest coin for which the machine is designed, for example a dime. The pins of this group are arranged in two lines of three pins each converging in a direction opposite to that in which the wheel upon which they are mounted is rotated. As shown in Fig. 7, the coins fall through the chute 42 upon that surface of the coin selector wheel which is uppermost. Hence, in the direction of rotation of the wheel indicated by the arrow in Fig. 7, and extending from the screws 45 to the brush, the coins present themselves to the pins at the diverging end and are carried toward the brush. The pins referred to in group 50 shown in Fig. 12, therefore diverge, so far as the travel of coins is concerned in an upward direction. The two pins 50' are therefore the uppermost of these pins. These pins are spaced apart a distance greater than the diameter of the dime but less than the diameter of the next largest coin, for example, a penny. The next set of pins are spaced apart a distance but slightly greater than the diameter of the dime so as to provide a guide way for this coin as it comes to rest upon the lowermost pins 50'' of the group, the two sets of pins 50 and 50'' serving to hold the coin in position upon the flat surface in which the pins are located, the coin then occupying a position in the center of this surface as shown by the dotted lines in Fig. 12. Should a larger coin be presented to the entrance formed by the two pins 50', for example a penny, it can not completely pass through the space between the pins and occupies a position not wholly within the flat surface of the wheel as also shown in dotted line on Fig. 12. Now the central portion of the flat surface of the wheel occupied by the dime as shown in Fig. 12, is sufficiently below the adjoining cylindrical surface of the wheel that the coin does not project above such surface. Hence, assuming that two coins are upon the wheel as shown in Fig. 12, in the direction of rotation of the wheel shown in Fig. 7, the brush 25 passing over the cylindrical surface of the wheel would at once remove the larger coin from such surface but because of the lower position occupied by the smaller coin, the brush would not dislodge this coin from its position. The smaller coin is thus automatically selected and passes beyond the brush where it sets in operation certain mechanism later to be described.

The pins of the group 49 are so arranged in converging lines that the dime passes between the pins which are spaced the shortest distance apart and hence the dime passes completely through the group. The selective operation which occurs between the penny and the next higher coin, for example, the nickel, is, however, identical with that already described, the penny entering sufficiently to occupy the position completely within the flat surface of the wheel as shown in dotted lines on Fig. 11 and the nickel occupying a position projecting upon the cylindrical surface and in the path of the brush as also shown in dotted lines on Fig. 11. Two lines of five pins each are shown in this group. The greater number here, it has been found practical to use to better guide the dime in its passage completely through the group and to guide the penny into position.

In the groups of pins numbered 60 on Fig. 10 and designed for the largest coin, for example the nickel, it has been found necessary to employ but two pins, spaced apart a distance sufficient to allow the passage therebetween of the next largest coin. These pins are so placed that the nickel comes into position in the center of the flat surface of the wheel and hence, like the smaller coins before mentioned, escapes the sweeping action of the brush.

While in each instance the brush may engage the surface of the coins which are in position against their respective pins, such action is not sufficient to dislodge any coin which lies wholly within the flat surface. In fact, this sweeping action being in a direction against the advancing coins upon the flat surfaces, serves merely to more firmly lodge them against the pins.

Attached to the interior frame of the machine by rivets 51 or any other convenient means is a cam ring 52. Mounted upon the hub 53 of the coin selector wheel is a member 54, the link-shaped bearing of the member 54 on the hub 53 being such as to permit reciprocation of the member 54 transversely of the hub 53 and of the shaft 12. The member 54 carries a plunger 55 extending through a perforation in the rim of the coin selector ring and spring pressed away from the axis of the wheel by the spring 56. Upon the member 54 adjacent to the plunger 55 is a roller 57 extending toward and in contact with the edge of the cam ring 52. The cam ring 52 has a circular interior edge or bearing surface for the roller 57 except for the cam recess 58 extending toward the rim of the coin selector wheel. By this construction, the member 54 with plunger 55 is carried by and rotates with the coin selector wheel, and the roller 57 being pressed against the interior edge of the stationary cam ring 52, retains the member 54 concentric with the shaft 12 and the plunger 55 within the peripheral surface of the coin selector wheel during the travel of the roller over the circular portion of the cam ring. When, however, the cam recess 58 is reached, the spring 56 causes the roller 57 to follow therein, thus projecting the plunger 55 outwardly beyond the peripheral surface of the coin selector wheel. It is to be noted that the cam recess 58 is located on a line within the chute 42 and that the plunger is therefore projected upward within the chute and withdrawn before the brush is reached. The object of this reciprocation of the plunger 55 is to so stir up the coins within the chute and adjacent the wheel that any wedging action of the coins upon one another or upon the sides of the chute which would "choke" the mechanism is obviated.

Journaled in bearings on each side of the machine frame is a shaft 58, upon which is journaled a figure 2-shaped spring supporting member 59. Upon the upper extremity of this supporting member is pivoted a presser member 61 pressed by the spring 62 to ride within the central groove 63, Figs. 11 and 12, upon the peripheral surface of the coin selector wheel. Attached to the lower end of the supporter member 59 is a metallic band 64, partially encircling the coin selector wheel, and of a width sufficient to substantially cover and retain a coin in position as the coin is carried downward by the coin selector wheel. This metallic band is spring pressed toward the periphery of the wheel by the spring pressed plunger 65, reciprocating in the V-shaped recess 66 in the frame of the machine.

By the construction above described, the coin in passing to the left of the brush 25 first engages the pressure member 61. Upon the continued rotation of the coin selector wheel, the coin carried thereby passes under the metallic retaining band 64 until it reaches the extreme lower end thereof when it is in position to drop into the coin receiver 67.

Adjacent the shaft 58 is a second shaft 69 also journaled in each side frame of the machine. Fixedly mounted on this shaft 69 is a hub 70 carrying at one end a pawl 71 extending downwardly through a slot 72 in the metallic band 64 and into the central groove 63 in the peripheral surface of the coin selector wheel and into the path of the coins to be operated by them. At the end of the hub 70, opposite to that upon which the pawl 71 is secured and extending upwardly, is a detent 73. Above and to the right of shaft 69 carrying the pawl and detent referred to, is a stud shaft 74 extending from the motor side of the frame. Upon this shaft is journaled an upwardly extending sector gearing. Integral with sector 75 is a rocking pawl 76 carrying the roller 77 to be operated upon by the cam wheel 14. Upon the sector 75 is a pin 78 with which the detent 73 engages to retain the sector immovable.

The cam wheel 14 is constructed with its elevated portions all of equal distance from the center of shaft 12 upon which it is mounted, and these portions are placed out of alinement with the coins when in their proper position upon the pins. By this arrangement, the rocking pawl 76 is rocked upwardly by the elevated portions of the cam wheel in turn rocking the sector upwardly to its highest or inoperative position where it is held by the detent 73, this detent being spring pressed toward the pin 78 by the coiled spring 79 upon the end of shaft 69. This coiled spring 79 engages one end of shaft 69 as shown in Fig. 4, while its opposite end is attached to the spring case 80, the abutment for the spring being provided by the pin 81.

Journaled in both upper side frames of the machine adjacent the toothed portion of sector 75, is a shaft 82, having fixedly mounted thereon a small toothed gear wheel 83, shown in dotted lines in Fig. 10, and in full lines in Fig. 5, which gear wheel meshes with the sector 75. Shaft 82 has upon its end opposite to the motor side of the machine a spring device 84 similar to the spring device on shaft 69. The spring device 84 tends to impart rotation to shaft 82 and in consequence to the gear wheel 83 in a clockwise direction and is only restrained from so doing by the engagement of the sector 75 with the gear wheel 83 and the retention of the sector by the detent 73. When, however, the detent is released the spring device 84 rotates the gear wheel 83, which in turn rocks the sector 75 upon its shaft 74 to lowered position. The subsequent elevation of the sector by the cam wheel operating on rocking pawl 76, rotates wheel 83 and shaft 82 in a direction opposite to that first mentioned and restores the spring device 84 to its original condition. Upon shaft 82 is also fixedly mounted the large gear wheel 85 which meshes with the gear wheel 86 journaled upon a short stud shaft 87. The gear 86 in turn meshes with the gear wheel 87' journaled on the shaft 88 extending through the bracket 89, Fig. 3. Fixedly attached to this gear wheel 87 is the ratchet 90 shown in dotted lines on Fig. 10. Shown in elevation in Fig. 5, is an indicator of a type well known in fare registers, and the details of which form no part of the present invention. In this indicator as here employed, five indicator wheels are used, each beginning with the one shown on the left in Fig. 5, are operated upon by the indicator wheel on its right, the rotary movements for all being transmitted therefore through the right hand indicator wheel. This indicator forms no part of our present invention. This brief description is, therefore, all that is deemed necessary here.

In the present invention, the right hand indicator wheel has rigidly attached thereto a broad toothed wheel 91 upon which is the pawl 92 pressed by the spring 93 into engagement with the ratchet 90 upon the gear wheel 87.

Now when rotation in a clockwise direction, as indicated by the arrow on Fig. 10, is imparted by spring device 84 to shaft 82, gear wheel 85 rotating in the same direction imparts a contrary rotation to gear wheel 86. Gear wheel 86, in turn, imparts a clockwise rotation to gear wheel 87 and ratchet 90. This rotation, however, does not operate the indicator wheels for as observed from Fig. 10, the direction of rotation of ratchet 90 is such that pawl 92 rides over the teeth upon this ratchet. The clockwise rotation of gear wheel 82 and the downward rocking of sector 75 when unrestrained by detent 73 is not, therefore, an indicator operation.

The cam wheel 14 is arranged with its elevated portions, as already stated, in advance of the coin selecting pins so that until the coins have been carried into operative position against operating pawl 71, the detent 73 is in elevated position against pin 78 retaining sector 75 in its upper position against pressure of spring device 84 exerted through shaft 82 gear 83 upon sector 75. The coin selecting and position retaining pins are, as shown in Fig. 10, placed slightly in the rear of the elevated positions of the cam and slightly in advance of the depressed positions. When, therefore, a coin is carried by these pins upon the coin selector wheel into contact with the end of operating pawl 71, the coin rocks this pawl toward the left in Fig. 10, and the detent 73 toward the right away from pin 78. The spring device 84 immediately rotates the shaft 82 in a clockwise direction, rocking the sector downward, the roller 77 following into the depressed portion of the cam. During this operation, as already stated, the indicator is not set in operation due to the ratchet and pawl arrangement described. Upon the continued rotation of cam wheel 14 in the direction indicated by the arrow in Fig. 10, however, the roller 77 upon rocking pawl 76 rides through the depressed portion of the cam and ascends the advancing side of the next elevation. By this ascent, the pawl 76 is again rocked upward returning the sector 75 to its upward position and in so doing, the sector imparts rotation to the gear wheel 83 in a counter clockwise direction or opposite to that indicated by the arrow on Fig. 10, and this gear through gears 86 imparts rotation to gear 87' in also a counter clockwise direction, setting the teeth of ratchet 90 against pawl 92 and thus rotating broad toothed wheel 91, which being fixedly attached to the right hand or unit indicator wheel sets it in rotation.

As is obvious from the construction here shown the extent of rotation of the unit indicator wheel determines the count and its registration. This extent of rotation in our present invention is determined by the following arrangement of the coin selector pins and the cam wheel: The cam wheel, as shown in Fig. 10, is made with depressions and elevations corresponding respectively in number with the groups of selector pins. The indicator wheels, where the decimal system of currency is used, is marked upon the 360 degrees of its peripheral surface with indications one tenth of the circumference or 36 degrees apart. Taking the unit indicator wheel for illustration, one complete rotation starting from the zero mark would return to zero and set in operation the next adjacent indicator wheel, both indicator wheels then indicating the numeral 10. For pennies, therefore, the unit indicator wheel would be required to rotate through one tenth of its entire rotation, for nickels five tenths, etc. The depressed portions of the cam are graduated into certain degrees of depression relative to one another corresponding to the value of the coins adjacent the depressions. For example, the deepest depression is shown at 94 on Fig. 10. This depression is such that when the pins 50 immediately in advance thereof select a dime from the coins in the chute 42 and carry it by rotation of the coin selector wheel into contact with the pawl 71, the sector 75 released thereby, rocks first downward and then upward in going through the depression 94, and ascending the next elevation, an extent sufficient to turn the unit wheel one complete rotation by the mechanism already described. The depressions 96 in the cam wheel adjacent the nickel selector pins are made one-half the extent of depressions of those adjacent the dime selector pins, and in consequence, in the manner already described, the unit wheel is turned one-half rotation and five units are recorded. Likewise, the depressions 97 adjacent the penny selector pins are made one-tenth the extent of depression of those adjacent the dime selector pins and in consequence, by the mechanism set in motion by the one cent piece, the indicator wheel is turned through but one-tenth a rotation and one unit is recorded. In operation various coins may be on the coin selector wheel simultaneously. No mistake in the count can, however, occur since the roller 77 upon the pawl 76 must ride through one depression and ascend its adjacent elevation before the next coin and its adjacent depression are reached, and therefore the sector 75 for each descent is rotated downward an extent sufficient for each ascent to rotate the indicator wheel the proper distance.

To provide a positive lock against rotation of the indicator gear wheels beyond the degree of rotation determined by the mechanism described, the wheel 91 upon the unit indicator wheel is provided with ten teeth equally spaced apart and a locking lever 98 is pivoted upon the frame 24 to engage therein. The lower end of this lever carries a roller in position to be engaged by the cam 99 integral with or attached to the sector. This cam is positioned to contact with the locking lever when the sector is moving downwardly and upwardly in the act of rotating the unit indicator wheel, thus rocking the lower end of the lever to the left, as the parts are shown in Fig. 10, and its upper end to the right out of locking position. When, however, the sector has completed its upward ascent and the consequent rotation of the unit wheel is complete, the cam is out of contact with the locking lever. The lever is then, by means of spring 100, attached to its upper end and to the frame of the machine, drawn into locking position.

The coins having accomplished the operations stated, are carried by the coin selector wheel beyond the lower end of the metallic retaining band 64 and drop into the coin separator 67. This coin separator, as shown in Figs. 7 and 8, includes mechanism for sorting the coins and depositing them in separate compartments according to their denominations. Three compartments are shown, 101, 102 and 103 for nickels, pennies and dimes, respectively. Fig. 8 shows in longitudinal section, the device which separates the coins before delivery into the compartments below. The first delivery chute, 104, has an entrance from the slide-way 105 of a formation to guide the smallest coin employed, for example, the dime, therein, but preventing because of its size and the presence of guide ways thereover, the entrance of the larger coins. The entrance to this chute 104 is semi-circular at the side which the coin first reaches, as shown at 106, Fig. 8, save for cut away portions 107. On the opposite side a bridge is formed rising slightly from the floor of slide-way 105 and having side portions 109 extending in advance of the edge 106, the space between these extending portions being of greater width than the diameter of the smallest coin but providing a bridging surface for the larger coins. The wall immediately above this entrance is recessed upon curved lines as shown at 110 in Figs. 7 and 9. By this construction the dime upon reaching the semi-circular entrance 106, and the squared out portions 107, passes so far over the edge 106 that it is quickly tilted upward, the recess 110 providing sufficient space for this, and the coin then drops into the chute 104 and thence into the compartment 103. The larger coins, upon reaching the bridge portions 109, are unable to pass therebetween and ride over the surfaces 109 and 108. The next entrance 111, is made of a size sufficient to permit the passage of the next largest but insufficient to permit the passage of the largest coin. This entrance has the advance side cut out at the corners forming a square entrance which gives quick and easy access thereto. Between the sides of this entrance are left bridge portions 112 which carry the largest coins thereacross to be deposited in the last compartment 101.

The three compartments 101, 102 and 103 are formed into a cash drawer which can be withdrawn from the lower frame work of the machine for the purpose of making change, the compartments being of curved formation toward their front or opening end to permit the ready extraction of the coins therefrom. A thin metallic member 113 is attached to the bracket 114, Fig. 7, and functions to guide the rapidly descending coins into the coin separator 67.

In addition to the mechanism above described, by which the counting and dial indicating device shown in elevation in Fig. 5 is automatically set in operation by the coins themselves, there is shown in Figs. 15 and 16, a registering mechanism likewise set in operation by the coins, to take a permanent record of the count indicated upon the counting and indicating device. The details of this printing mechanism itself constitute no part of the present invention, but forms the subject matter of Patent No. 694,322 issued on February 25, 1902, to John F. Ohmer, Hiram Tyler and W. F. Breidenbach as joint inventors. This printing mechanism will therefore be described here only in so far as essential to show how it is made use of in the present invention, reference being had to the aforesaid patent for a more detailed description. Upon the shaft 82 which bears the gears 83 and 84 transmitting motion from the sector 75 to the counting device already described, is shown in Figs. 15 and 16, fixedly mounted a wheel 111′. The wheel 111′ is laterally offset from the counting wheels shown in Fig. 5 so that its periphery which extends beyond the periphery of the counting wheels, will not interfere with the operation of said wheels. Upon said wheel 111′ is a spring pressed pawl 112′, Fig. 16, engaging the ratchet 113′ loosely mounted on the shaft 82. Upon the hub of the ratchet 113′ and rotating therewith is a sprocket wheel 114 about which is passed a chain 115. As shown in Fig. 16, the pawl 112′ and the ratchet teeth 113′ are so arranged that rotation is imparted to sprocket wheel 114 in a counter-clockwise direction, as indicated by the arrow, from the wheel 111′. This motion of wheel 111′ is imparted thereto by sector 75 when rocking upwardly in the operation of rotating the counting wheels, the sector 75 imparting its motion through gear wheels 83 and 85 as already described. Upon the downward movement of sector 75, which, as already explained, is not a counting wheel operating movement, gears 83, 85, shaft 82 and wheel 111′ are rotated in clockwise direction as shown by arrow on Fig. 10, and during this rotation of wheel 111′, the pawl 112′ rides over teeth of ratchet 113′ and sprocket wheel 114 is not rotated. Hence sprocket wheel 114 is rotated only when the coin counting wheels are rotated and in the same degrees of rotation.

Upon an extended portion 117 of the lower frame of the machine is placed the registering mechanism receiving operations from the chain 115. In the side frames 118 of this registering mechanism is mounted shaft 116, upon which is loosely mounted the sprocket wheel 119 about which the lower end of chain 115 is placed. There is shown in full lines at 120, Fig. 16, a unit wheel similar in operation to the unit counting wheel already described, save that upon wheel 120 are placed type numerals while on the unit counting wheel indicating numerals are placed as shown in Fig. 5. Attached to sprocket 119 is a toothed gear wheel 121, the teeth of which correspond in number and in spaced position with the type numerals on wheel 120, which in turn corresponds in number and in spaced position with the indicator numerals on the counting wheels. Where the decimal system of currency, for example, is used, there are upon the type and upon the counting wheels referred to ten spaced numerals beginning with 0 and ending with 9. This ten toothed gear 121 meshes, as shown, with a ten-toothed wheel 122, shown in dotted lines, as attached to the unit wheel 120. For each complete rotation, therefore, of sprocket wheel 119, the unit type wheel is rotated a complete rotation and all the numerals upon its surface are successively brought into position.

The foregoing description of the operation of the unit type wheel is deemed sufficient for the present purpose, the next succeeding type wheels being operated in a manner well known in fare register devices and as shown in the Patent No. 694,322 already referred to.

Upon an upwardly spring pressed bracket 123, Fig. 15, is carried an ink roll 124 Fig. 16. Journaled in a pivoted carrier 125, is a shaft 126 carrying a wheel 127 with a pin 128 thereon. Upon the interior of carrier 125, shaft 128 has a laterally extended flattened portion 131 with adjacent curved surfaces, shown in full lines at 132. At the bottom of carrier 125 is supported a roll of paper, from which the paper extends upwardly upon the platen bar 130 and through the paper rolls 134 and then outwardly in position to be torn off by the operator. In the end of shaft 126, opposite to the pin wheel 127, is a key way, not shown, for the insertion of a shaft turning key. Upon rotation of shaft 126 thereby in a counter clockwise direction, pin 128 engages a pronged portion 129 of the bracket 123 and lowers ink roll carried thereby into contact with type wheel 120 and upon further rotation of shaft 126, pin 127 rides out of prongs 129 allowing ink roll 124 to ascend and out of path of platen 130. Upon still further rotation of shaft 127, cam surfaces 132 are turned to press platen 130 with the paper thereon against the inked type wheels and an impression is taken which, because of the mechanisms already described, is identical with the indications on the counting wheels. The paper is fed through the machine either by hand wheel 135 upon one of the feed rolls 134, or by gearing intermediate shaft 127 and such feed rolls whereby a last turn of key in shaft 126 feeds paper outwardly for separation from the machine. By this construction a permanent record of the total count made upon the counting wheels is obtained.

In Fig. 17 is shown a mechanism for distributing the coins to the various compartments of the cash drawer, differing from the mechanism already described. Upon the frame of the machine, below and laterally of cam wheel 14, is a lever 136 with a roller 137 thereon extending laterally toward the cam wheel and spring pressed to ride on the cam surfaces thereon. Immediately below the coin selector wheel 13 is a coin receiver, arranged in position to receive the coins passing from the lower end of the restraining band. The lower end of receiver 138 is cylindrical in shape and provides a bearing surface for the coin distributer 139 pivoted thereto upon shaft 140. The pivoted member 139 has upwardly curved extensions fitting over and bearing upon the cylindrical surface of receiver 138 and circular end portions, the two portions together providing a coin chute with closed sides and at the same time permitting a lateral swinging of the lower portions for the distribution of coins. Since the extreme peripheries of the cams on cam wheel 14 are all an equal distance from shaft 12 upon which cam wheel 14 rotates, the lever 136 is rocked downward by each cam surface an invariable distance. The upward movement of lever 136, however, under the influence of its returning spring varies in extent corresponding to the relative graduations of the depressed portions of the cam wheel between the elevated cam surfaces. This variable upward movement is transmitted to the lower portion 139 of the coin distributer by link 141. Below distributer 139 is the coin entrance device 142, the upper surface of which is formed along the arc described by the lower end of coin distributer 139. Passage or slide-ways 143, 144 and 145 are formed therein delivering to the compartments 101, 102 and 103 already referred to. These passages or slide-ways 143, 144 and 145 are formed in predetermined positions dependent upon the positions to which the member 139 is swung by the variable upward movements of lever 136 as already described, the member 139, as said lever rides over each cam elevation, swinging to the extreme right in Fig. 16, and returning to position over a slide-way 143, 144 or 145 as it enters the next cam depression. The lever 136 is so positioned beneath cam wheel 14 and is made of such length that its roller 137 follows into a cam depression at a point slightly in advance of the position of a coin when about to escape from the lower end of restraining band 64. The swinging distributer 139 is therefore carried into position over a slide-way by the time the coin is free to drop by gravity therethrough. By this construction and operation, the proper coin is unfailingly deposited in the compartment designed for its reception. Assuming, for example, that a five cent piece is in position upon pins 60, Fig. 10, adjacent cam depression 96, the roller 137 riding therein causes lever 136 to swing distributer 139 over passage 144, Fig. 17, at a time when the coin is in position to be freed from restraining band 64, and the coin drops by gravity through the distributer and through passage 144 into compartment 101 designed for its reception. A like operation distributes the dime and the penny into its proper compartment. Moreover, since the depressions on cam wheel 14 are separated by elevations which do not swing distributer 139 into alinement with a coin passage at a time when a coin is in position on the coin selector wheel to drop therethrough, the passage of coins into the wrong compartment is impossible. This coin distributing operation, it is further to be noted, is the same in principle as that of the coin counting and registering, both being accomplished through a single variable movement device such as the cam wheel 14, the extent of whose movement is dependent upon the coin to be counted, registered and distributed.

While the form of mechanism here shown and described is admirably adapted to fulfil the objects primarily stated, it is to be understood that it is not intended to confine the invention to the one form of embodiment herein disclosed, for it is susceptible of embodiment in various forms, all coming within the scope of the claims which follow:

What is claimed and desired to be secured by Letters Patent is:

1. In a coin counting device, counting and indicating wheels rotatable through predetermined degrees for the counting and registering of coins of varying denominations, a hopper to receive coins of varying denominations, coin selector means comprising a wheel the peripheral surface of which moves in the path of the coins within said hopper, said peripheral surface having spaced flattened or straight-edged portions, pins embedded therein and projecting from said flattened surfaces a distance sufficient to retain on each flattened surface a single coin, the pins upon the surface designed for the reception and retention of the largest coin for which the machine is designed being spaced apart a distance less than the diameter of such coin but greater than the diameter of the coin next in size, the remaining pins being arranged in groups upon each flattened surface, each group comprising two straight lines of pins diverging in the direction of rotation of the wheel, the divergent end providing the entrance and the convergent end providing the exit for all coins save those designed to be retained thereon, the arrangement of pins being such as to select and retain upon the periphery of said wheel at least one coin of each of the denominations for which the machine is designed, a cam wheel adjacent said first mentioned wheel with cam surfaces corresponding in number and location to the coin selecting and retaining pins, the cam surfaces being each graduated in degree corresponding to the relative value of the coin to be retained in its adjacent coin selecting and retaining pins, a sector gear imparting movement to the counting and registering wheels and pivoted for varying degrees of movement in a single plane corresponding to the predetermined degrees of rotation required of the counting and registering wheels, a rocker arm on said sector gear arranged to be operated by said cam surfaces, a detent normally holding said rocker arm out of operating relation with said cam surfaces, said detent disposed in the path of the coins upon said coin wheel to release the rocker arm by contact with said coins, a locking mechanism automatically locking said counting and indicating wheels, means upon the sector gear releasing said locking mechanism upon movement of said sector gear to operate the counting and indicating wheels.

2. In a machine of the type specified, the combination of a hopper for the initial reception of coins of various denominations, a coin selector wheel movable in the path of the coins within said hopper, a cam wheel movable concurrently with said coin selector wheel, a counter, means interposed between said counter and said cam wheel and imparting to said counter varying degrees of movement by which the coin values are counted, a cam ring 52 attached to the frame of the machine, and means actuated by said cam ring 52 including a plunger adapted to be projected into said hopper to stir the coins within the hopper and thereby prevent any choking of the same.

3. In a machine of the type specified, a hopper for the initial reception of coins, a coin selector wheel movable in the path of the coins within said hopper, a cam wheel adjacent to said coin selector wheel, a counter, mechanism interposed between said counter and said cam wheel for operating said counter, mechanism arranged in the path of the coins on said coin selector wheel adapted to normally hold the counter, and to release said counter mechanism for operation, a cam ring 52, a reciprocating member 54 mounted on the coin selector wheel and adapted to be actuated from said cam ring 52, and a plunger 55 carried by said reciprocating member and adapted to agitate the coins within said hopper whereby said coins are prevented from becoming choked in their delivery to the coin selector wheel.

4. In a machine of the character specified, a hopper adapted to contain a collection of coin of different values, a selector wheel having its periphery provided with grooves and coin collecting pins movable below the discharge opening in said hopper and collecting the coins therefrom, a supporting member, a presser member mounted on said supporting member in a position to ride in the central groove of said selector wheel, and adapted to initially engage the coin thereon, and a metallic band supported by said supporting member and encircling the periphery of said coin selector wheel below said presser member, whereby the coin is maintained in position on the selector wheel during the continued rotation thereof.

5. In a coin counting and registering device, counting and printing wheels rotatable to varying degrees for the counting and registering of coins of varying denominations, a hopper to receive coins of varying denominations, a coin selector wheel rotating with its peripheral surface moving in the path of the coins within said hopper, spaced coin selecting and retaining means thereon separating and positioning the coins from said hopper upon the peripheral surface of said wheel in predetermined positions corresponding with the denomination of the coin, a supporting member, a presser member carried thereon in a position above the periphery of said coin selector wheel, a metallic band also carried by said supporting member whereby the coin is maintained in position on the coin selector wheel during a continued rotation thereof, a cam wheel adjacent said coin wheel with cam surfaces corresponding in number and location to the coin selecting and retaining means, the cam surfaces being each graduated in degree corresponding to the relative value of the coin in its adjacent coin selecting and retaining means, counting and printing wheel rotating mechanism adapted for operation by the cam surfaces aforesaid, a trip mechanism disposed in the path of the coins upon said coin wheel, said trip mechanism normally holding the counting and printing wheel rotating mechanism out of operative position with said cam surfaces but adapted to release said mechanism for operation by said cam surfaces upon contact with a coin upon said coin wheel, together with means for obtaining an impression from said printing wheel.

6. In a machine of the character specified, a hopper adapted to contain a collection of coins of different values, a selector wheel having its periphery provided with grooves and coin-collecting pins movable below the discharge opening of said hopper and collecting the coins therefrom, a supporting member, a presser member mounted on said supporting member in a position to ride in the central groove of the selector wheel and adapted to initially engage the coins thereon, an elastic band supported by said supporting member around the periphery of said coin-selector wheel and below the presser member, whereby the coins are maintained in a position on the selector wheel during the continued rotation thereof, a cam adjacent to said selector wheel, a swinging delivery chute adapted to receive the selected coins from said wheel and to deliver the same to separate compartments, and means interposed between said cam and said swinging delivery chute for actuating said chute.

7. In a machine of the character specified, a hopper adapted to contain a collection of coins of different values, a selector wheel having its periphery provided with grooves and coin-collecting pins movable below the discharge opening of said hopper and collecting the coins therefrom, a supporting member, a presser member mounted on said supporting member in a position to ride in the central groove of said selector wheel and to initially engage the coins thereon, an elastic band surrounding said coin-selector wheel below the presser member whereby the coins are maintained in position on the selector wheel during the continued rotation thereof, a cam movable with said selector wheel, and a register actuated from said cam to register the coins selected by said wheel.

8. In a machine of the character specified, a hopper adapted to contain a collection of coins of different values, a selector wheel having its periphery provided with grooves and coin-collecting pins movable below the discharge opening of said hopper and collecting the coins therefrom, a supporting member, a presser member mounted on said supporting member in a position to ride in the central groove of said selector wheel and adapted to initially engage the coins thereon, an elastic band encircling said coin-selector wheel below the presser member whereby the coins are maintained in position on the selector wheel during the continued rotation thereof, a cam movable with the selector wheel, a register actuated from said cam to register the coins as carried by said selector wheel, and a swinging chute adapted to receive the coins from said selector wheel and to deposit the same in different compartments, said chute being actuated from said cam.

9. In a machine of the character specified, a hopper adapted to contain a collection of coins of different values, a selector wheel having its periphery provided with grooves and coin-collecting pins movable below the discharge opening of said hopper and collecting the coins therefrom, a coin-retaining member partially inclosing said selector wheel and adapted to maintain the coin thereon to the point of their discharge from the selector wheel, and a presser member adapted to ride in the central groove of said selector wheel and to initially engage the coin thereon and to direct the same to the said coin-retaining member.

10. In a machine of the character specified, a hopper adapted to contain a collection of coins of different values, a selector wheel having its periphery provided with grooves and coin-collecting pins movable below the discharge opening of said hopper and collecting the coins therefrom, a coin-retaining member inclosing a portion of said wheel and adapted to maintain the coin thereon as they are carried to the point of their discharge from said wheel, a presser member adapted to ride in one of said grooves of said selector wheel to initially engage the coins thereon and to maintain the coin in position to pass under said coin-retaining member, a cam movable with said selector wheel, and a register actuated from said cam and adapted to count the different coins carried by said selector wheel.

11. In a machine of the character specified, a hopper adapted to contain a collection of coins of different values, a selector wheel having its periphery provided with grooves and coin-collecting pins movable below the discharge opening in said hopper and collecting the coins therefrom, a presser member riding in one of the grooves of said selector wheel and initially engaging the coins thereon, a cam movable with said selector wheel, and a swinging chute receiving the coins from said selector wheel and operated from said cam to positions to discharge the coins in different compartments.

12. In a machine of the character specified, a hopper adapted to contain a collection of coins of different values, a selector wheel having its periphery provided with grooves and coin-collecting pins movable below the discharge opening in said hopper and collecting the coins therefrom, a presser member riding in one of the grooves in said selector wheel and initially engaging the coins thereon, a cam movable with said selector wheel, a register movable from said cam, and a swinging chute receiving the coins from said selector wheel and actuated from said cam to deposit the coins in different compartments.

13. In a machine of the character specified, a hopper adapted to contain a collection of coins of different values, a selector wheel having its periphery provided with grooves and coin-collecting pins movable below the discharge opening of said hopper and collecting the coins therefrom, a presser member riding in one of the grooves of said selector wheel and initially engaging the coins thereon, means for maintaining the coins in position on said selector wheel during the rotation thereof, a cam movable with said selector wheel, and a swinging chute receiving the coins from said wheel, said chute being actuated from said cam to deliver the coins to different compartments.

14. In a machine of the character specified, a hopper adapted to contain a collection of coins of different values, a selector wheel having its periphery provided with grooves and coin-collecting pins movable below the discharge opening in said hopper and collecting the coins therefrom, a presser member riding in one of the grooves of said selector wheel and initially engaging the coins thereon, means for maintaining the coins in position on said selector wheel during the continued rotation thereof, a cam movable with said selector wheel, and a register actuated from said cam to count the coins delivered from said selector wheel.

In testimony whereof we affix our signatures in the presence of two witnesses.

HENRY H. FEFELL.
JOHN F. OHMER.

Witnesses:
IDA F. LUTZ,
H. B. OHMER.

Copies of this patent may be obtained for five cents each, by addressing the "Commissioner of Patents, Washington, D. C."